United States Patent [19]

Monnot et al.

[11] Patent Number: 4,936,366
[45] Date of Patent: Jun. 26, 1990

[54] PNEUMATIC TIRE

[75] Inventors: Michael J. Monnot, North Canton; Daniel Richmond, Akron, both of Ohio

[73] Assignee: The Goodyear Tire & Rubber Company, Akron, Ohio

[21] Appl. No.: 318,448

[22] Filed: Mar. 1, 1989

Related U.S. Application Data

[63] Continuation of Ser. No. 137,032, Dec. 23, 1987, abandoned.

[51] Int. Cl.$^5$ .................................................. B60C 9/18
[52] U.S. Cl. ...................................... 152/536; 152/534
[58] Field of Search ............... 152/536, 534, 526, 451, 152/527, 535, 538, 560

[56] References Cited

U.S. PATENT DOCUMENTS

| | | | |
|---|---|---|---|
| 3,095,026 | 6/1963 | Weber | 152/458 |
| 3,242,965 | 3/1966 | Mirtain | 152/527 |
| 3,656,533 | 4/1972 | Barassi et al. | 152/527 |
| 3,690,364 | 9/1972 | Barassi et al. | 152/528 |
| 3,799,233 | 3/1974 | Cappa | 152/458 |
| 3,814,162 | 6/1974 | Hashida et al. | 152/535 |
| 3,851,693 | 12/1973 | Takemura et al. | 152/361 |
| 3,874,436 | 4/1975 | Hashida et al. | 152/534 |
| 3,896,869 | 7/1975 | Fujishima et al. | 152/527 |
| 4,034,791 | 7/1977 | Mirtain | 152/536 X |
| 4,170,255 | 10/1979 | Greiner et al. | 152/527 |
| 4,183,389 | 1/1980 | Grosch | 152/528 |
| 4,184,529 | 1/1980 | Boileau | 152/529 X |
| 4,184,530 | 1/1980 | Mirtain | 152/527 |
| 4,237,953 | 12/1980 | Mathevet | 152/529 |
| 4,274,464 | 6/1981 | Pommier | 152/454 |
| 4,286,645 | 9/1981 | Boileau | 152/534 |
| 4,371,025 | 2/1983 | Canevari et al. | 152/454 |
| 4,407,347 | 10/1983 | Mirtain | 152/534 X |
| 4,436,131 | 3/1984 | Yamaguchi et al. | 152/528 |
| 4,585,045 | 4/1986 | Morikawa et al. | 152/536 |
| 4,602,666 | 7/1986 | Kabe et al. | 152/527 |
| 4,711,286 | 12/1987 | Kabe et al. | 152/527 |

FOREIGN PATENT DOCUMENTS

| | | | |
|---|---|---|---|
| 0237599 | 9/1987 | European Pat. Off. | |
| 8022901 | 12/1980 | Fed. Rep. of Germany | |
| 3034363 | 5/1982 | Fed. Rep. of Germany | |
| 2248161 | 5/1975 | France | 152/536 |
| 2472484 | 7/1981 | France | 152/536 |
| 2536018 | 5/1984 | France | |
| 2009060 | 6/1979 | United Kingdom | |

*Primary Examiner*—Raymond Hoch
*Attorney, Agent, or Firm*—R. J. Slattery, III

[57] ABSTRACT

A radial-ply passenger or light truck tire (10) having an annular tread-reinforcing structure (24) located between the tread portion (12) and the carcass (18). The tread-reinforcing structure (24) has one belt ply of steel cords oriented at an angle A, with respect to the mid-circumferential centerplane, and a second belt ply of aromatic polyamide fiber cords oriented at an angle B with respect to the mid-circumferential centerplane of the tire. The angle B is less than the angle A and the difference between angle A and angle B is greater than zero and less than or equal to eight degrees.

12 Claims, 2 Drawing Sheets

PNEUMATIC TIRE

This is a continuation of application Ser. No. 137,032 filed December 23, 1987, now abandoned.

BACKGROUND OF THE INVENTION

The present invention relates to radial-ply pneumatic tires. Specifically this invention relates to passenger or light truck tires utilizing an annular tread-reinforcing structure having one belt ply of steel cords and a second one of aromatic polyamide fiber cords.

In general, conventional pneumatic radial tires have an annular tread-reinforcing layer or belt package having two belt plies both of which are usually comprised of cords made from the same material, such as steel, fiberglass, etc. However, there has been an attempt lately to produce a tire having a belt package of two different types of belts. For example, U.S. Pat. No. 4,602,666 to Kabe et al (1986) teaches the use of one belt having steel cords and another belt of aromatic polyamide fiber cords having its side ends bent or folded over toward each other. Another attempt has been to place the aromatic polyamide fiber cords radially inwardly from the steel cords and then to provide for strips to overlap the ends of the steel belt as shown in U.S. Pat. No. 4,184,530 to Mirtain (1980). Neither of these patents produces a tire having only a single belt ply of steel and a single belt ply of aromatic polyamide. Furthermore, using two different types of belt plies can produce various problems.

It is believed that the difference in the bending stiffness between the steel cord and the aromatic polyamide cord causes extra stress within the tire. As used herein bending stiffness is the resistance of the belt material to forces which cause both in plane and out of plane bending and is expressed in terms of force per unit area, e.g. lbs/in$^2$. This stress may manifest itself in premature or uneven tread wear and/or a reduction in durability performance, such as premature tire failure due to belt separations. It is believed that these problems can be reduced by equalizing the stiffness of the different types of cords.

The cords of each belt make an angle with respect to the mid-circumferential centerplane of the tire. It is believed that the stiffness of the aromatic polyamide cords can be increased to more approximate that of the steel by reducing the angle that they make with respect to the mid-circumferential centerplane. In other words, the angle which the aromatic polyamide cords make should be less than the angle which the steel cords make with respect to the mid-circumferential centerplane. Therefore, the stiffness of both belts can be adjusted to produce a more equal result. The mathematics of the above, i.e., whereby the stiffness of the aromatic polyamide cord increases with a reduction in cord angle, is outlined by the equations for Youngs Modulus as a function of cord angle in Mechanics of Pneumatic Tires by J D Walter and incorporated as a reference herein.

Furthermore, as used herein, including the claims, the following terms are defined as follows:

"Axial" and "axially" refer to directions and/or displacements that are parallel to the axis of rotation of a tire.

"Bead" means that part of the tire comprising an annular tensile member wrapped by ply cords and shaped to fit the design rim.

"Carcass" means the tire structure apart from the belt structure, tread, undertread, and sidewall rubber over the plies, but including the beads.

The "mid-circumferential centerplane" of a tire is a plane that is perpendicular to an axis of rotation of a tire and which is located midway between the external surfaces of the sidewalls of a tire at its maximum axial width exclusive of ornamentation or indicia.

"Radial" and "radially" refer to directions and/or displacements from the axis of rotation of the tire.

"Radial-ply tire" means a pneumatic tire in which the ply cords which extend from bead to bead are laid at cord angles between 75 degrees and 90 degrees with respect to the mid-circumferential centerplane of the tire.

"Sidewall" means that portion of a tire between the tread and the bead.

"Tread" means that portion of the tire that comes into contact with the rod when the tire is normally inflated and under normal load.

"Tread width" means the arc length of the tread surface in the axial direction.

SUMMARY OF THE INVENTION

This invention makes it possible to produce a radial-ply passenger or light truck tire having an annular tread-reinforcing structure or belt package having one belt of steel cords and a second belt of aromatic polyamide fiber cords. More particularly this invention is to provide an annular tread-reinforcing structure having a single belt ply of steel cords and a single belt ply of aromatic polyamide cords without having to bend or fold over the belt ends of the aromatic polyamide belt or to require the use of reinforcing strips.

The tire is comprised of a carcass having a circumferentially extending ground engaging tread region disposed over it. A sidewall region extends radially inwardly from each axial edge of the tread region and has a circumferentially extending bead core therein. The carcass has at least one reinforcing ply extending from one bead region to the other bead region. Two belt plies are located between the tread region and the carcass and extend circumferentially about the carcass. One belt ply has a plurality of parallel inextensible steel cords which are disposed within an elastomeric material. Preferably the cords are 2×0.30 high tensile (Ht) steel. The other belt ply has a plurality of parallel aromatic polyamide fiber cords.

The steel cords of the first ply are embedded in an elastomeric material and are oriented at a first cord angle while the aromatic polyamide fiber cords of the other belt are embedded in an elastomeric material and are oriented at a second cord angle. The second cord angle is less than the first cord angle. As a result, the stiffness of the steel belt and the stiffness of the aromatic polyamide belt are more nearly equalized.

BRIEF DESCRIPTION OF THE DRAWINGS

The following is a brief description of the drawings in which like parts bear like reference numerals and in which.

DETAILED DESCRIPTION OF THE INVENTION

Figure 1:
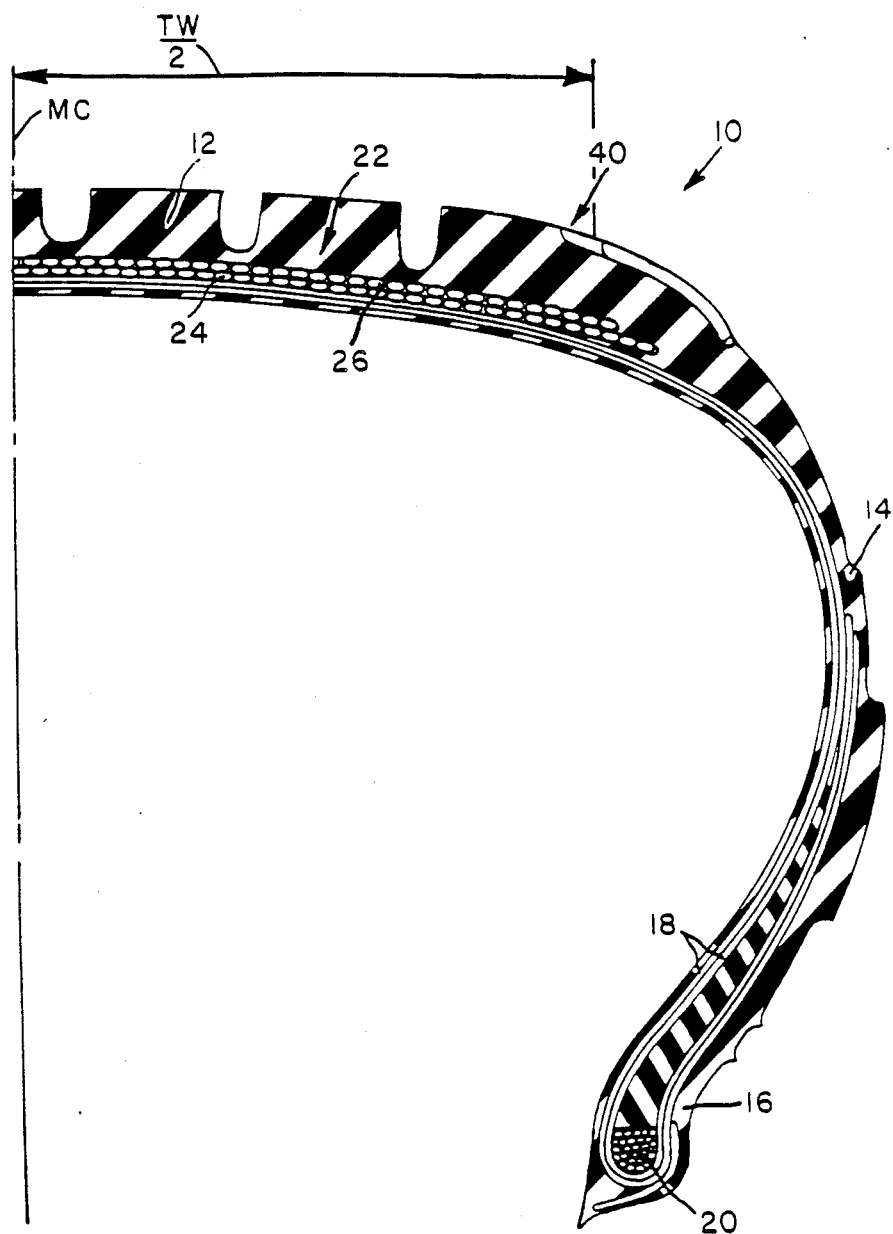
FIG. 1 is half of a cross-section of a tire according to one embodiment of this invention.

Now referring to FIG. 1, there is shown half of a radial cross-section of a pneumatic tire, shown generally as reference numeral 10. The tire 10 has a circumferentially extending tread portion 12 with a sidewall portion 14 extending radially inwardly from each axial edge of the tread portion to an annular bead portion 16. The tread portion 12 and sidewalls 14 are comprised of a suitable elastomeric substance, such as a natural or synthetic rubber compound, selected in accordance with engineering standards that are widely known in the tire art.

The pneumatic tire 10 has one or more carcass-reinforcing plies 18 located radially inwardly of the tread portion 12 and extending to the bead portion 16 where they are anchored about substantially inextensible bead cores 20. The carcass-reinforcing plies have a number of parallel reinforcing elements or cords extending to produce a radial-ply tire. The reinforcing elements or cords of the carcass ply may be polyester or other suitable material such as rayon, nylon or fiberglass with polyester being the most preferred.

An annular tread-reinforcing structure, or belt structure 22 is located radially inwardly of the tread portion 12 and radially outwardly of the carcass-reinforcing plies 18. The belt structure 22 has two single layers of belts 24 and 26 of parallel cords embedded in an elastomeric material. One belt ply has cords oriented at a left cord angle with respect to the mid-circumferential plane MC of the tire. The other belt has cords oriented at a right cord angle with respect to the mid-circumferential plane MC of the tire. In the preferred embodiment, the radially inner belt 24 has metallic cords, such as steel, while the radially outer belt 26 has aromatic polyamide fiber cords. Each belt has an axial width which extends into the shoulder region of the tire 40. They both may be of equal width or as shown in FIG. 1, one of the belt plies may be axially offset at its axial edges from the other by approximately one half of an inch. Furthermore, both plies may have an axial width substantially equal to or slightly greater than the tread width (TW) of the tire.

Figure 2:
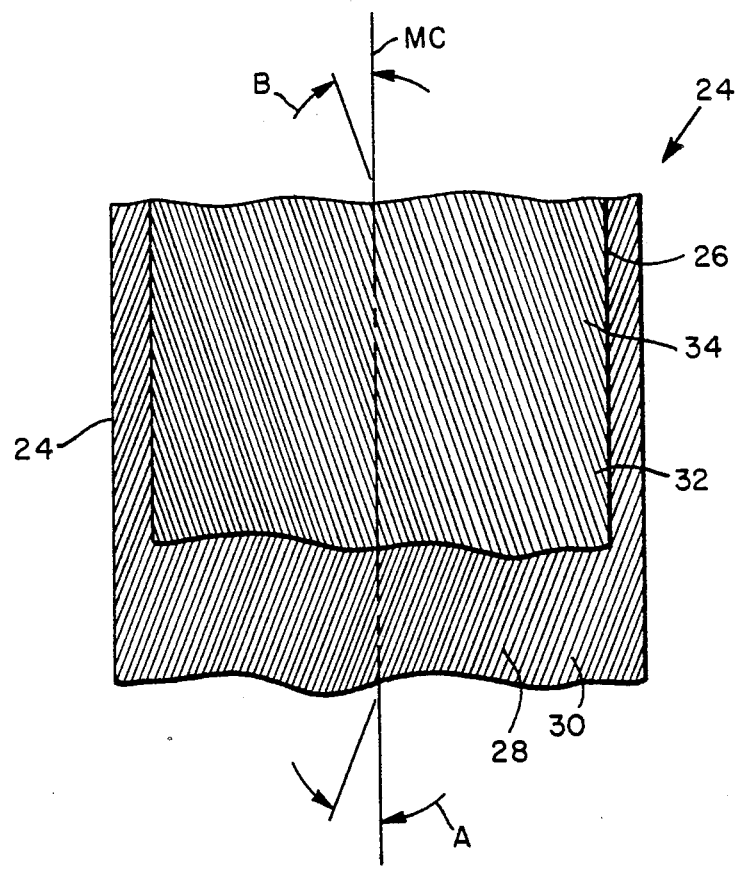
FIG. 2 is a partial view of the belt package of a tire according to FIG. 1.

Now referring to FIG. 2, there is illustrated a partial view of the annular tread-reinforcing structure or belt package 24 of FIG. 1. The radially inner belt 24 has a number of parallel steel cords 28 embedded in an elastomeric material 30 and oriented at a cord angle A with respect to the mid-circumferential centerplane of the tire. The cord angle A has a range from 18 degrees to 25 degrees with a more preferred range being from about 20 degrees to about 24 degrees. In the preferred embodiment the cords 28 of the radially inner belt 24 are comprised of two filaments of finely drawn high tensile steel wire twisted about one another. Preferably the filament diameter is 0.30 mm and its tensile elastic modulus is 190 GPa or greater. The cord is designated as 2×0.30 (HT), indicating a two filament twisted cord having filaments of 0.30 mm diameter of a high tensile steel wire, wherein high tensile is steel made with a carbon content by weight of 0.7 to 0.9% and preferably 0.82%. The cords of each belt have a minimum break strength of about 95 lbs. The cords are arranged to produce a belt having between 20 to 29 ends per inch. A more preferred range is from about 23 to 26 ends per inch. Therefore, the most preferred inch strength (break strength×ends per inch) is from about 2185 lbs to about 2470 lbs.

The use of a 2×0.30(HT) steel belt helps minimize tread squirm while providing lateral and circumferential rigidity. This improves the cornering performance while providing excellent resistance to impact and penetration. Furthermore, locating the steel belt radially inward of the aromatic polyamide fiber belt helps prevent it from cut exposure, penetration and therefore helps prevent the cords from corroding.

The radially outer belt 26 has a number of parallel aromatic polyamide fiber cords 32 embedded in an elastomeric material 34 and oriented at a cord angle B with respect to the mid-circumferential centerplane of the tire. The cord angle B is less than the cord angle A of the steel belt. Reducing the cord angle B of the aromatic polyamide produces a corresponding increase in the stiffness of the aromatic polyamide belt 26. The cord angle B is therefore reduced from the cord Angle A, in order to more equalize the stiffness of the steel 24 and aromatic polyamide belt 26. The angular difference between the steel cord angle A and the aromatic polyamide cord angle B is shown as Angle $A$ − Angle $B = Y$, where Y is believed to be within a range of greater than zero and less than or equal to 8 degrees. A more preferred range is believed to be within a range of greater than one and less than or equal to 6 degrees. However, the angular difference selected is also determined by other performance properties of the tire. For example, if the difference is too great for the materials used problems may develop with the ride and/or handling. An angular difference of 3 degrees provides for a better balance of stiffness while preserving the other tire performance properties. The cord angle B has a range from 17 degrees to about 24 degrees while the more preferred range is from 17 degrees to about 21 degrees.

The cords 32 have a minimum break strength of about 170 lbs. The cords 32 are further arranged to produce a belt having between 14 to 18 ends per inch. The diameter of the aromatic polyamide cords can be in the range of 0.026 inches (0.68 mm) to 0.0343 inches (0.87 mm) with the more preferred diameter being about 0.031 inches (0.787 mm). The cords of aromatic polyamide may be comprised of three filaments having denier of 167 each.

These descriptions and details have been shown for the purposes of illustrating this invention and it will become apparent to those skilled in the art that various changes and/or modifications may be made therein without departing from the original spirit or scope of the invention.

What is claimed:

1. A radial-ply tire comprising:
    a carcass;
    a circumferentially extending ground engaging tread portion disposed over and about the carcass;
    a sidewall region extending radially inwardly from each axial edge of the tread portion to an annular bead portion, each said annular bead portion having a circumferentially extending bead cord;
    said carcass having at least one reinforcing ply extending from one bead portion to the other bead portion; and
    an annular tread-reinforcing structure disposed between the tread portion and the carcass, extending circumferentially about the carcass, consisting of a first single unfolded belt ply disposed over a second single unfolded belt ply, each belt ply having a plurality of parallel cords disposed within an elastomeric material, the cords of one of the first and second belt plies consisting of inextensible metallic cords oriented at a first single with respect to a mid-circumferential plane, the cords of the other belt ply of the first and second belt plies consisting of aromatic polyamide fiber cords oriented at a second angle with respect to the mid-circumferential plane, said second angle being less than said first angle to substantially equalize the stiffness between the first and second belt plies, wherein Y, the angular difference between the first cord angle and the second cord angle is within the range of greater than 1 and less than or equal to 6 degrees, and each belt ply having an axial width which extends into a shoulder region of said tire.

2. The tire of claim 1 wherein said angular difference Y is about 3 degrees.

3. The tire of claim 2 further comprised by:
said metallic cords having steel cords, oriented at said first angle in a range of about 20 degrees to about 25 degrees; and
the aromatic polyamide fiber cords oriented at said second angle in a range of about 17 degrees to about 21 degrees.

4. The tire according to claim 3 wherein the steel cords are arranged to produce between 20 to 29 ends per inch.

5. The tire according to claim 4 wherein the aromatic polyamide fiber cords are arranged to produce between 14 to 18 ends per inch.

6. The tire of claim 5 wherein the steel cords are comprised of $2 \times 0.30$ mm high tensile steel.

7. The tire of claim 1 wherein the aromatic polyamide fiber cords have a diameter in the range of 0.026 inches (0.68 mm) to 0.0343 inches (0.87 mm).

8. The tire of claim 7 wherein the aromatic polyamide fiber cords have a diameter of about 0.031 inches. (0.787 mm).

9. The tire of claim 3 wherein the cords of said first belt are aromatic polyamide fiber cords and said cords of said second belt are steel cords.

10. The tire of claim 9 wherein the axial width of each belt said ply is substantially equal to the tread width of the tire.

11. The tire of claim 1 further comprised by:
said metallic cords having steel cords, oriented at said first angle in a range of about 20 degrees to about 25 degrees;
the aromatic polyamide fiber cords oriented at said second angle in a range of about 17 degrees to about 21 degrees; and
the aromatic polyamide fiber cords have a diameter in the range of 0.026 inches (0.68 mm) to 0.0343 inches (0.87 mm).

12. The tire of claim 3 wherein the cords of said first belt or steel cords and the cords of said second belt are aromatic polyamide fiber cords.

* * * * *